United States Patent
Chen

(10) Patent No.: US 6,705,721 B1
(45) Date of Patent: Mar. 16, 2004

(54) OPENABLE ATTACHMENT SUNGLASS TO THE SPECTACLES

(76) Inventor: Lee-Tsung Chen, P.O. Box 697, Feng-Yuan City, Taichung Hsien (TW), 420

( * ) Notice: Subject to any disclaimer, the term of this patent is extended or adjusted under 35 U.S.C. 154(b) by 0 days.

(21) Appl. No.: 10/386,692

(22) Filed: Mar. 13, 2003

(51) Int. Cl.⁷ .................................................. G02C 9/00
(52) U.S. Cl. ........................................... 351/47; 351/57
(58) Field of Search .............................. 351/47, 48, 57, 351/58

(56) References Cited

U.S. PATENT DOCUMENTS

| | | | | |
|---|---|---|---|---|
| 3,183,523 A | * | 5/1965 | Harrison | 2/13 |
| 3,741,634 A | * | 6/1973 | Stoltze | 351/57 |
| 6,089,708 A | * | 7/2000 | Ku | 351/47 |
| 6,283,591 B1 | * | 9/2001 | Chen | 351/47 |
| 6,604,822 B1 | * | 8/2003 | Chen | 351/47 |

* cited by examiner

Primary Examiner—Huy Mai

(57) ABSTRACT

An openable attachment sunglass to the spectacles includes a sunglass having a pair of plane dark colored glasses connected by a bridge and a horizontal bar projected inward from the inside of the bridge and pivoted to an upright lug on the top of a clip which is composed of an upper clip plate pivoted to a horizontal lug on rear side of the upper clip plate. Each of the upper and lower clip plates has a pair of obliquely and symmetrically extended branches on front side made in registry with each other and each of the branches has a magnet in distal portion. When the clip clips the bridge of the spectacles, the upper and lower clip plates will firmly clip each other due to the attraction of the magnets. The sunglass is able to turn upward to form a right angle relative to the lens plane of the spectacles when the user stays indoor.

2 Claims, 3 Drawing Sheets

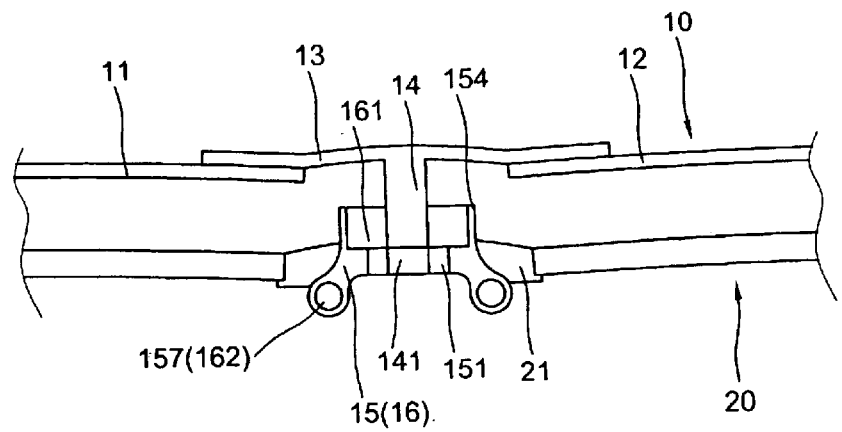
FIG. 4
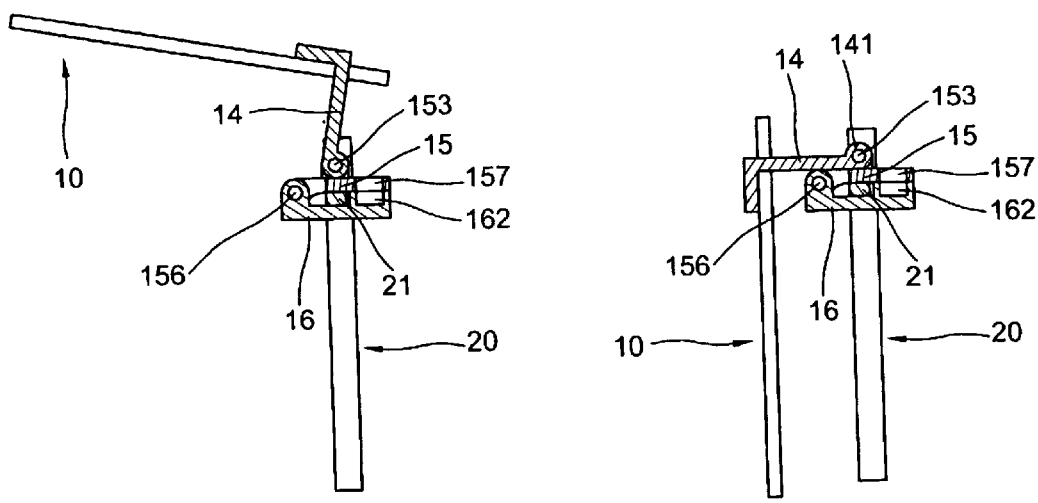
FIG. 6
FIG. 5

OPENABLE ATTACHMENT SUNGLASS TO THE SPECTACLES

BACKGROUND OF THE INVENTION

The present invention relates to spectacles and more particularly to an openable attachment sunglass to the spectacles.

As we know that a nearsightedness needs to wear a myopic spectacles, otherwise he can see nothing in front of him. If he goes outdoor under sunshine, he has to wear a sunglass to protect his eyes from the strong sunlight. However, the sunglass has to have certain degrees suitable to him. Due to the myopic sunglass is difficult to manufacture and expensive, it is not welcomed by the nearsightedness. Thus the producer produces an attachment sunglass to the spectacles to protect the nearsightedness from the sunlight and becomes popularity in the market. This type of attachment sunglass generally uses a clip to attach the sunglass to the spectacles that is not so stable and reliable to improve this defectiveness. Applicant adopts magnets to the clip which has obtained U.S. Pat. Nos. 6,283,591 B1 and 6,293,672 B1. This improved structure is really strengthened the clipping effect. But still has some disadvantages such that it is inconvenient when the user returns back indoor, he has to remove the attached sunglass and to attach it again when he goes out under sunlight. So that only an openable attachment sunglass can solve this problem.

SUMMARY OF THE PRESENT INVENTION

The present invention has a principal object to provide an openable attachment sunglass to the spectacle which the sunglass, except magnetically attached to the spectacle but also can be opened upward to form a right angle between the sunglass and the lens plane of the spectacles or turned down to close to the front surface of the lens of the spectacles in order to facilitate the user to wear the spectacles both indoor or outdoors.

Accordingly, the attachment sunglass of the present invention comprises a pair plane dark colored glasses connected a bridge, a horizontal bar projected inward from the inner side of the bridge including a transverse tube pivoted to the upright lug of an upper clip plate which further has a horizontal lug pivoted to a transverse tube on the top of a lower clip plate. Each of the upper and lower clip plates has at least a magnet in the distal of their oblique extension attract one another. So the attached sunglass can be able to open upward to form a certain angle relative to the lens plane of the spectacles or to turn downward to close the front surface of the lens of the spectacles after that the clip plates firmly clip the bridge of the spectacles.

The present invention will become more fully understood by reference to the following detailed description thereof when read in conjunction with the attached drawings.

BRIEF DESCRIPTION OF THE DRAWINGS

FIG. 4 is a top plane view of FIG. 3, FIG. 5 is a sectional view of FIG. 3, and FIG. 6 is a sectional view indicating that the attachment sunglass is turned upward to form a right angle between the lens plane of the spectacles.

DETAILED DESCRIPTION OF THE PREFERRED EMBODIMENT

Figure 1:
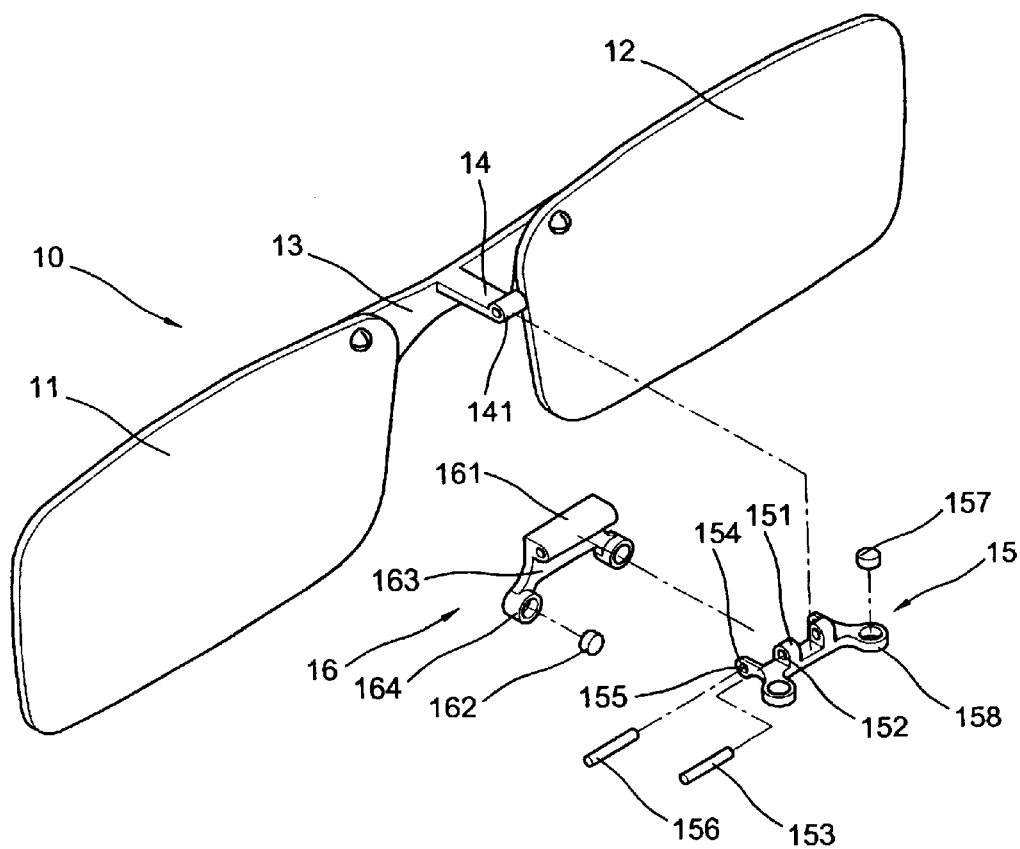
FIG. 1 is an exploded perspective view to show the attachment sunglass of the preferred embodiment of the present invention.
Figure 2:
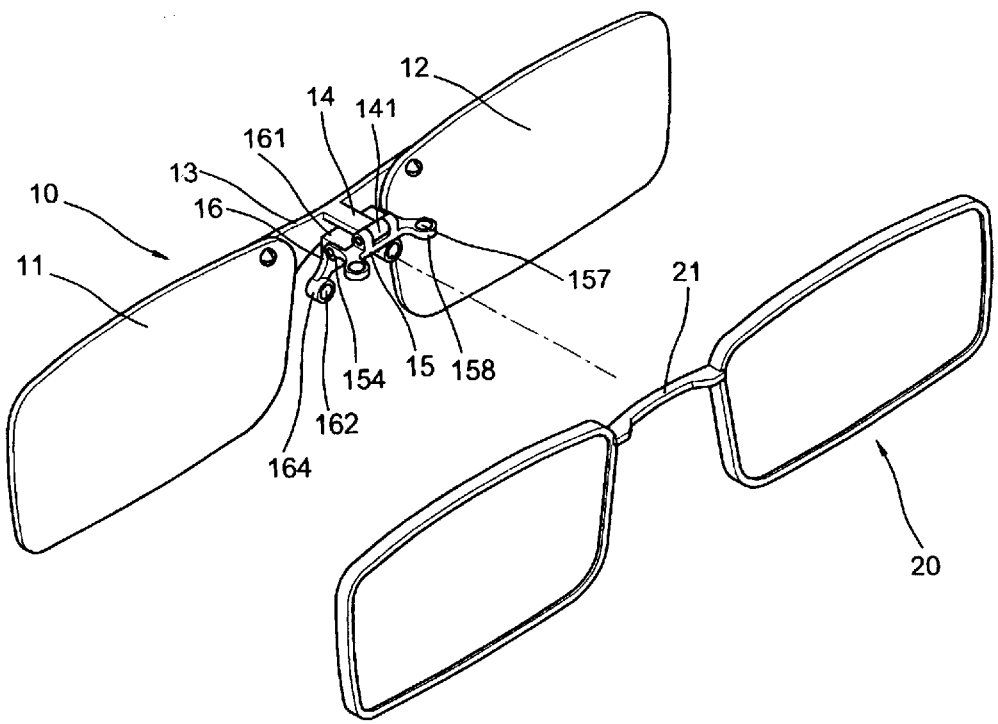
FIG. 2 is an exploded perspective to show that the attachment sunglass is about to attach to the spectacles.

With reference to FIGS. 1, 2, 3 and 4 of the drawings, the openable attachment sunglass to the spectacles of the present invention comprises an attached sunglass 10 having a pair of plane dark colored glass 11 and 12 connected by a bridge 13, a horizontal bar 14 centrally projected inward from the inner side of the bridge 13 including a transverse pivotal tube 141 at distal thereof, an upper grip plate 15 having an upright lug 151 including an aligned through 152 engaged with the transverse pivotal tube 141 and rotatably secured by a first retaining pin 153, a horizontal lug 154 including an aligned through hole 155, a pair of first obliquely and symmetrically extended branches 158 each including a magnet 157 in distal portion, a lower clip plate 16 having a long transverse pivot tube 161 on the top including a through hole in the body engaged with the horizontal lug 154 of the upper grip plate 15 and rotatably secured by a second retaining pin 156, a pair of second obliquely and symmetrically extended branches 164 each including a magnet 162 in the distal portion made in registry with the first obliquely and symmetrically extended braches 158 of the upper grip plate 15 and a receiving space 163 formed between the long transverse pivot tube 161 and the branches 164 for receiving the bridge 21 of the spectacles 20.

Figure 3:
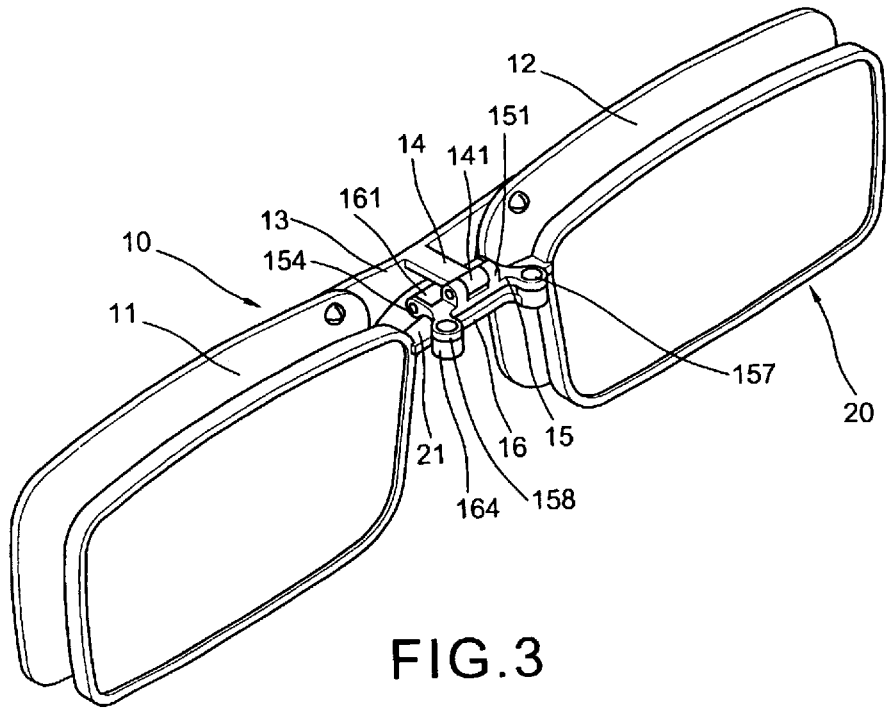
FIG. 3 is a perspective view to show that the attachment sunglass is already clipped to the spectacles.

Based on the afore discussed structure, in use opens the upper and lower grip plate 15 and 16 to let the bridge 21 of the spectacles 20 entered in plate in the receiving space 163 of the lower grip plate 16, then closes the upper and lower grip plates 15 and 16, the magnets 157 and 162 will automatically attract one another. So that the attachment sunglass 10 is firmly gripped the bridge 21 of the spectacles 20 and the plane dark colored glasses 12 of the sunglass 10 attached to the front surface of the lens of the spectacles 20 (as shown in FIGS. 3, 4 and 5). Meanwhile, the user can wear it to go outdoor under the sunlight. When he comes back indoor temporarily, he can open the sunglass 10 and the horizontal bar 14 rotates upward on the first retaining pin 153 to enable the sunglass 10 to form a right angle for about 90° relative to the lens plane of the spectacles 20. Therefore the sunglass 10 is unnecessary to remove but firmly clips the bridge 21 of the spectacles 20 without loosening off except that the use voluntarily removes it.

Although the structure of the grip is of a previous invention of the applicant and the opening manner of the sunglass 10 is of conventional. But the combination of the magnetic grip with the opening manner is still not available in the market. It is necessary to combine the above two structures together to give the convenience and practicality to the user. The novelty of this invention is not doubtfully.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. An openable attachment sunglass for attaching to spectacles comprising:

an attachment sunglass having a pair of plane dark colored glasses connected by a first bridge and a horizontal bar centrally projected inward from inner side of said first bridge including a transverse pivotal tube at distal thereof rotatably connected to a clip which clips a second bridge of said, said clip being combined with an upper clip plate and a lower clip plate, said upper clip plate having an upright lug on top including a first aligned through hole in distal portion engaged with a first through hole of said horizontal bar and rotatably secured by a first retaining pin, a horizontal lug projected inner from inner side thereof including a second aligned through hole in distal portion and a pair of first obliquely and symmetrically extended branches on opposite side of said horizontal lug each including a first magnet in distal portion, said lower clip plate having a long transverse pivot tube on top engaged with the horizontal lug of said upper clip plate and rotatabley secured by a second retaining pin, a pair of second obliquely and symmetrically extended branches on bottom each including a second magnet in distal portion made in registry with the first obliquely and symmetrically extended branches of said upper clip plate and a receiving space position between the long transverse pivot tube and the second obliquely and symmetrically extended branches for receiving the second bridge of said spectacles;

when clip clips the second bridge of said spectacles, said first and second magnets will attract one another.

2. The attachment sunglass as recited in claim 1 wherein said sunglass can be able to open upward to form an angle for about 90° relative to the lens plane of said spectacles.

* * * * *